(12) United States Patent  
Granzow et al.

(10) Patent No.: US 8,919,515 B2  
(45) Date of Patent: Dec. 30, 2014

(54) CLUTCH DEVICE

(71) Applicant: ZF Friedrichshafen AG, Friedrichshafen (DE)

(72) Inventors: Claus Granzow, Tettnang (DE); Martin Saitner, Aichstetten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 176 days.

(21) Appl. No.: 13/669,823

(22) Filed: Nov. 6, 2012

(65) Prior Publication Data

US 2013/0112522 A1 May 9, 2013

(30) Foreign Application Priority Data

Nov. 7, 2011 (DE) .......................... 10 2011 085 839

(51) Int. Cl.  
*F16D 11/14* (2006.01)  
*F16H 63/30* (2006.01)

(52) U.S. Cl.  
CPC ...... *F16H 63/304* (2013.01); *F16H 2063/3056* (2013.01); *F16H 2063/305* (2013.01)  
USPC ...................... 192/69.9; 192/89.27; 192/93 C

(58) Field of Classification Search  
USPC ............... 192/20, 69, 69.9, 84.1, 89.2, 89.21, 192/89.27, 93 C  
See application file for complete search history.

(56) References Cited

U.S. PATENT DOCUMENTS

| 2,375,781 A * | 5/1945 | Gilfillan | 192/84.1 |
| 2,894,775 A * | 7/1959 | Harless | 192/69.9 |
| 3,504,776 A * | 4/1970 | Misenti | 192/69.9 |
| 2012/0255382 A1 | 10/2012 | Richter et al. | |

FOREIGN PATENT DOCUMENTS

DE    10 2009 054 942 A1    6/2011

* cited by examiner

*Primary Examiner* — Jacob S Scott  
(74) *Attorney, Agent, or Firm* — Brinks Gilson & Lione

(57) ABSTRACT

The clutch device comprises a first clutch element and a second clutch element, which are each supported in a rotational manner on a common axis of rotation. In an engaged state, the clutch elements are coupled to one another in a form-locking manner by a sliding sleeve. The sliding sleeve is attached to the first clutch element in a rotationally fixed and axially displaceable manner. A peripheral surface of the sliding sleeve is provided with at least one step, having a first step flank and extending with a first step course on the peripheral surface of the sliding sleeve, wherein the first step course also has, at least in sections, at least one axial directional component in the direction of the axis of rotation. A placement agent can be displaced radially back and forth between an engaging placement agent position and a disengaging placement agent position, and is otherwise stationary.

10 Claims, 6 Drawing Sheets

CLUTCH DEVICE

RELATED APPLICATIONS

The present application claims priority to German Patent Application Number 10 2011 085 839.3, filed on Nov. 7, 2011, the entirety of which is hereby incorporated by reference herein.

BACKGROUND OF THE INVENTION

1. Field of the Invention

The invention relates to clutch devices.

2. Related Art

A clutch device of this type is, for example, designed as a claw clutch. A claw clutch can be actuated hydraulically or with an electric motor. With a hydraulic actuation, a pump is needed to generate the hydraulic pressure, as well as valves and pistons that can be activated for displacing the claw in both directions, i.e. to the engaged state and to the disengaged state. With an electric motor actuation, no hydraulic components, such as lines and hydraulic seals, however, are necessary. Instead, an electric motor and other mechanical transmission components are needed in order, for example, to convert the rotational motion of the electric motor to a linear motion for displacing the clutch claw in both directions. Both with the hydraulic, as well as the electric motor actuation, significant energy, which must be made separately available, is required to actuate the hydraulic pump or the electric motor, respectively. Moreover, the components in the two described actuation concepts are of considerable weight, and require a likewise not insignificant amount of space. The latter affects the design of the housing in which the clutch is contained. A further expenditure is required for the activation of the hydraulic pump or the electric motor, respectively.

From DE 10 2009 054 942 A1, a control unit for a gearwheel transmission is known, comprising a sliding sleeve disposed on a gear shaft in a rotationally fixed, and axially displaceable, manner for the releasable engagement of the gear shaft to an idler gear. The sliding sleeve has an external circumference provided with numerous actuating grooves. Actuation bolts can engage in the actuating grooves by means of placement agents that can be electromagnetically actuated for the purpose of sliding the sliding sleeve into the engaged position or the disengaged position. The actual force for displacing the sliding sleeve is taken from the rotational motion of the gear shaft. Two actuating grooves and two dedicated placement agents are provided in each case for the displacement to the engaged position and to the disengaged position. Altogether, the sliding sleeve has a total of four actuating grooves. Accordingly, there are also four dedicated placement agents. In particular, the latter increase the weight and the space requirements of the overall layout.

SUMMARY OF THE INVENTION

The invention relates to a clutch device having a first clutch element and a second clutch element, each rotationally supported on a common axis of rotation, and which, when in the engaged state, are coupled to one another in a form-locking manner by means of a sliding sleeve. The objective of the invention is, therefore, to provide a clutch device of the type indicated above, with which the additional energy needed for actuation is low, and which, furthermore, exhibits a reduced weight and a reduced space requirement.

For attaining the objective, a clutch device is provided. The clutch device relates to a unit having a first clutch element and a second clutch element, each supported on a common axis of rotation, and which are coupled together, or, in particular, connected, by means of a sliding sleeve, and in a form-locking manner, such that they can be released, in which the sliding sleeve is attached to the first clutch element such that it is rotationally fixed, and axially displaceable. Furthermore, a peripheral surface of the sliding sleeve is provided with at least one step, having a first step flank, and which extends over the course of the first step along the peripheral surface of the sliding sleeve, wherein the first step course, at least in sections, also exhibits at least one axial directional component in the direction of the axis of rotation. Furthermore, a placement agent is provided which can be slid back and forth radially between an engaging placement agent position and a first disengaging placement agent position, and is otherwise stationary, wherein the placement agent is located during the procedure for disengaging the two clutch elements in its first disengaging placement agent position on the first step flank, such that the sliding sleeve moves axially away from the second clutch element to a disengaged sleeve position with a rotation of the first clutch element, in which the first and second clutch elements are mechanically disengaged from one another. The sliding sleeve is furthermore supported by means of a spring acting in the axial direction, such that a spring force of the spring holds the sliding sleeve in an engaged sleeve position, clutch the first and second clutch elements mechanically to one another, or slides into said engaged sleeve position, if the placement agent is located in its engaged position.

The sliding sleeve can, at least in relation to the second clutch element, in particular, but preferably in relation to both clutch elements, be axially displaced. In this context, "axial" means an orientation along, or in the direction of the axis of rotation. Accordingly, "radial" means an orientation perpendicular to the axis of rotation, and "tangential" means an orientation in the circumferential or peripheral direction relative to the axis of rotation. Moreover, the sliding sleeve is preferably disposed coaxially to, in particular, on, the clutch elements. Thus, the common axis of rotation of the clutch elements also forms the axis of rotation of the sliding sleeve, by means of which a very compact construction of the clutch device can be obtained.

The first step course extending, in particular, between a clutch point and a declutch point, provided on the peripheral surface, in particular on the outer peripheral surface, of the sliding sleeve, also has, in particular, aside from the axial directional component, a tangential directional component. With the application of the placement agent to the first step flank, a rotational movement of the first clutch element and the sliding sleeve connected thereto in a non-rotational manner, is then converted in accordance with a given screw effect, to a longitudinal movement of the sliding sleeve. The energy for this sliding movement originates substantially from the rotational movement of the two clutch elements. The sliding sleeve is then axially pulled away from the second clutch element, and moved to a disengaged sleeve position, in which the clutch device is then in its disengaged state.

The placement agent is designed such that it is, in particular, radially displaceable in relation to the axis of rotation, and stationary in both the axial direction and in the peripheral direction, in relation to the axis of rotation. This means that the placement agent can be extended radially toward the axis of rotation in order to assume its engaging placement agent position, and retracted radially away from the axis of rotation in order to assume the disengaging placement agent position. The engaging placement agent position and the disengaging placement agent position therefore lie on a line, which runs substantially orthogonal in relation to the axis of rotation.

The disengagement movement of the sliding sleeve occurs, in particular, counter to the force of the spring by means of which the sliding sleeve is axially supported, in particular, on the first clutch element. The sliding sleeve is retained in the disengaged sleeve position as long as the placement agent rests against the first step flank. If the placement agent is moved away from the first step flank, and brought into its engaging placement agent position, the sliding sleeve, due to the pre-tensioned spring, is moved axially back, i.e. to the second clutch element, into the engaged sleeve position, in which the clutch device is then again in its engaged state.

Advantageously, in order to convey the sliding sleeve to the engaged state, therefore, no other placement agent is necessary. The return to the engaged sleeve position occurs exclusively via the effect of the spring force. As a result, the component and activation expenditure, required for the actuation of the clutch device, is reduced. Likewise, the space requirement is also reduced, such that the clutch device can be more easily fitted in the clutch housing, or an even smaller clutch housing can be used. As a result, the clutch device, in which the return of the sliding sleeve is caused by means of spring force, can be produced in a very cost-effective manner. The return to the engaged state is, for all practical purposes, always possible. As such, the two clutch elements can, for example, also remain stationary, thereby, or rotate backwards, and/or very quickly.

Advantageous designs of the clutch device can be derived from the characteristics of the claims.

A design in which the first step is part of a first groove, and the first step flank is a groove sidewall of the first groove, is favorable. A groove of this type can be very easily incorporated in the peripheral surface of the sliding sleeve. The production expenditure for this is low.

According to another favorable design, the peripheral surface of the sliding sleeve has a second step with a second step flank, and with a second step course, wherein the second step course contains, substantially, only a tangential directional component. Moreover, the first step opens into the second step, in particular, the first step flank transitions into the second step flank. Furthermore, the placement agent, when both clutch elements are in the disengaged state, rests against the second step flank. Accordingly, the first step flank serves, in particular, for the actual disengagement procedure, while the second step flank is preferably provided for retaining the clutch device in the disengaged state, as long as the placement agent rests against the second step flank. Due to the separation of these two functions, the two step flanks can be optimized in relation to their respective functions. Fundamentally, however, another alternative design is also possible, in which, for both the disengagement procedure, as well as for the retaining in the disengaged state, only the first step course is provided.

According to another favorable design, the first step opens at both ends into the second step. There are then, in particular, two junction positions provided for the first step flank to the second step flank. With this, it is possible to disengage the two clutch elements from one another independently of the rotational direction.

According to another favorable design, the second step is part of a second groove, and the second step flank is a second groove sidewall of the second groove. This results in the same production advantages that have already been described above for the first groove.

According to another favorable design, the second groove is deeper than the first groove. Moreover, the placement agent has, in particular in relation to the first disengaging placement agent position, a further extended second disengaging placement agent position. The placement agent is in the disengaged state of both clutch elements in its second disengaging placement agent position, and rests against the second groove sidewall of the deeper second groove, which forms the second step flank. Due to the different depths and the two disengaging placement agent positions of the placement agent, the two step flanks can be disengaged in a targeted manner. In particular, it is possible thereby to prevent that the placement agent returns to a position on the first step flank after executing the disengagement procedure, which does not correspond to a complete disengagement of both clutch elements. Instead, a somewhat "snapping in place" of the placement agent on the second step flank occurs as soon as the disengaged state has been reached. The different groove depths are not, however, necessary. In an alternative design, both grooves can also be of the same depth.

According to another favorable design, the peripheral surface of the sliding sleeve has a uniform peripheral shape between the first step flank and the second step flank. In particular, the surface material of the sliding sleeve in this intermediate region is entirely removed. There are, therefore, in this intermediate region, differing from a groove shape, no additional rises or recesses. As a result, a very secure placement of the placement agent on the first step flank is enabled. Furthermore, a jamming of the placement on other rises or recesses, respectively, is avoided. The same applies for frictional losses, which could otherwise occur on other rises or recesses, respectively.

According to another favorable design, the second step is the transition from the peripheral surface to an axial end surface of the sliding sleeve. The second step flank is then the axial end surface. The placement agent, when in the disengaged state, rests against the axial end surface, as a result of which, a particularly secure retaining of the sliding sleeve in the disengaged sleeve position is provided. The peripheral surface of the sliding sleeve between the first step flank and the edge of the axial end surface can be designed with (groove shape of the first step flank) or without (uniform peripheral shape with completely removed surface material) additional rises.

According to another favorable design, the placement agent again has a further extended, in particular in relation to the first disengaging placement agent position, second engaging placement agent position. In the disengaged state of both clutch elements, the placement agent then rests, in its second engaging placement agent position, against the axial end surface of the sliding sleeve. The favorable "clicking in place" of the placement agent on the axial end surface results thereby when the sliding sleeve is in its disengaged sleeve position, in a manner similar to that with the design, described above, having different groove depths. A design in which the first step flank is a part of a single groove, which opens in the axial end surface, is also fundamentally possible. With this design, however, another extended second disengaging placement agent position can also be provided, in order to ensure a resting against the axial end surface. This, however, is only optional. Likewise, the placement agent can have only a single disengaging placement agent position, provided both for when resting against the first step flank within the groove, as well as when resting against the axial end surface.

According to a favorable design, the spring is supported on the first clutch element. This results in a very compact construction.

The proposed clutch device preferably concerns a clutch device of a motor vehicle, in particular a land vehicle, such as an automobile or a truck. A drive train of such a motor vehicle normally contains a drive motor, for example an internal combustion motor and/or electric motor, as well as a gear transmission, i.e. a transmission by means of which it is possible to change gears (and therefore, gear ratios) of the transmission (and therefore the drive train), as well as a transfer case, i.e. a lateral or longitudinal transfer case, by means of which a drive torque of the drive motor can be distributed between numerous drive wheels, or drive axles of the drive train. In drive train transmissions of this type, there is normally only a very limited amount of installation space available. As a result of the low requirements for installation space of the clutch device proposed according to the invention, said clutch device is particularly suited for use in such a transmission, i.e. the clutch device concerns, in particular, a clutch device for a motor vehicle drive train transmission of this type. With the use of the clutch device in a gear changing transmission, it serves preferably for the engagement or disengagement, respectively, of one or more of the gears in the transmission, while the clutch device, through the use of a transfer case, preferably serves for the technical drive engagement and disengagement of at least one of the drive axles, or, respectively, one of the drive wheels of the drive train.

The clutch device is, however, also suited for many other uses. As such, the clutch device is also suited to engage and disengage a power unit, such as, for example, a cooling agent pump, a refrigerating agent pump, a hydraulic pump, a current generator, a compressor, a cable winch, a farming or forestry machine, etc. to, or from, respectively, a machine drive train or the motor vehicle drive train specified above.

The characteristics given in the claims as well as in the following embodiment examples of the clutch device according to the invention, are all suited for obtaining the subject matter according to the invention, either alone, or in combination with one another. The respective characteristic combinations represent, with respect to the development of the subject matter of the invention, no limitation, but instead exhibit only exemplary characteristics.

BRIEF DESCRIPTION OF THE DRAWINGS

Further characteristics, advantages and details of the invention can be derived from the following description of embodiment examples, based on the drawings.

DETAILED DESCRIPTION

Corresponding parts are provided with the same reference symbols in FIGS. 1-16. Details of the embodiment examples explained in greater detail in the following can also represent an invention in and of themselves, or part of the subject matter of an invention.

Figure 1:
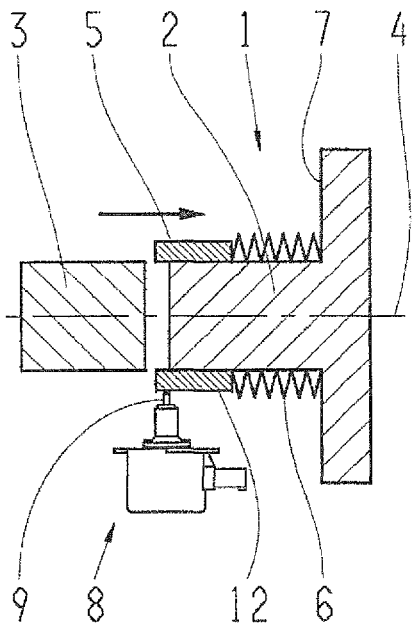
FIGS. 1 and 2 depict an embodiment example of a clutch device having two clutch elements, which can be coupled to one another in a rotationally fixed manner by means of an axially displaceable sliding sleeve, in the disengaged state, as well as in the engaged state.
Figure 2:
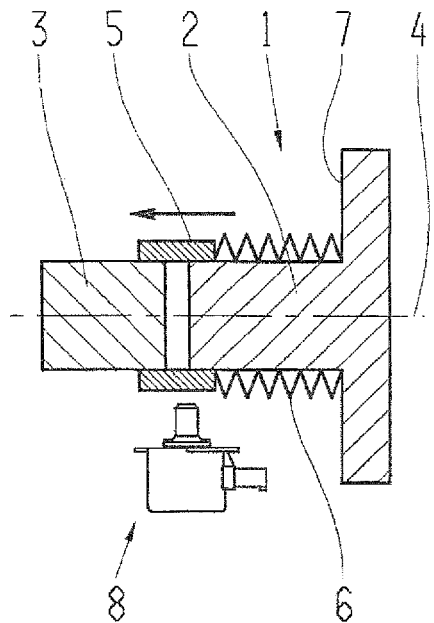

An embodiment example is shown in FIGS. 1 and 2 of a clutch device 1 having a first clutch element 2 and a second clutch element 3 in a longitudinal section depiction. The clutch device 1 can, in particular, relate to a claw clutch. The two clutch elements 2 and 3 are each supported in a rotational manner on a common axis of rotation 4. They can be coupled to one another in a form-locking manner, by means of an axially, back and forth, displaceable, i.e. in the direction of the axis of rotation 4, sliding sleeve 5. The sliding sleeve 5 is disposed thereby, coaxially to the clutch elements 2, 3, i.e. the axis of rotation 4 of the clutch elements 2, 3 simultaneously forms the axis of rotation for the sliding sleeve 5, as a result of which a very compact construction of the clutch device 1 is obtained.

The sliding sleeve 5 is substantially designed as a hollow cylindrical component, on the interior peripheral surface of which (not shown in FIGS. 1 and 2 for the purpose of obtaining a clearer depiction) grooves and teeth are provided, forming an inner ring gear, which acts together with outer ring gears, also not shown in FIGS. 1 and 2, corresponding thereto, on the two clutch elements 2 and 3, such that a form-locking, rotationally fixed connection between the sliding sleeve 5 and the first or second clutch element, 2 or 3, respectively, is obtained. The connection is, however, at least with respect to the second clutch element 3, releasable. In particular, the grooves or teeth can be designed as wedge or polygon shaped.

It is not shown that, preferably, a synchronization agent, for example one or more synchronization rings, can also be disposed between the sliding sleeve 5 and the clutch element 3. These cause, firstly, a rotational rate compensating friction fit between the clutch elements 2, 3 when the clutch elements 2, 3 are coupled, before the form-locking connection between said clutch elements is established.

In the disengaged state depicted in FIG. 1, the sliding sleeve 5 is in contact with only the first clutch element 2, while no contact to the second clutch element 3 exists. The sliding sleeve 5 in this case is in its disengaged sleeve position. In contrast, the sliding sleeve 5 is in contact with both clutch elements 2 and 3 when in the engaged state depicted in FIG. 2, resulting in a rotationally fixed clutch of the two clutch elements 2 and 3. In this state, the sliding sleeve 5 is in its engaged sleeve position.

The sliding sleeve 5 is supported by means of a spring 6 opposite a projection 7 provided on the first clutch element 2. In the disengaged state shown in FIG. 1, the spring 6 is pre-loaded. The spring force attempts to displace the sliding sleeve 5 axially back in the direction of the second clutch element 3. This means that the spring force of the spring 6 acts in the direction of the second clutch element 3 against the sliding sleeve 5.

The axial displacement of the sliding sleeve 5 to the disengaged sleeve position according to FIG. 1 is caused by means of a placement agent 8, designed in the embodiment example as an actuator that can be actuated electromagnetically with an actuation bolt 9 that can be displaced radially in relation to the sliding sleeve. The actuation bolt 9 can be moved back and forth between the extended disengaging placement agent position shown in FIG. 1 and the retracted engaging placement agent position shown in FIG. 2. Other actuations of the actuation bolt 9 are also possible, in particular a spring induced, electric motor, hydraulic or pneumatic actuation, i.e. for sliding the actuation bolt 9 into the retracted or extended state.

The placement agent 8 is preferably disposed in a stationary manner on a housing, not shown here, within which the clutch elements 2, 3 are disposed in a rotational manner on the axis of rotation 4. The housing can, in particular, be a transmission housing.

Figure 3:
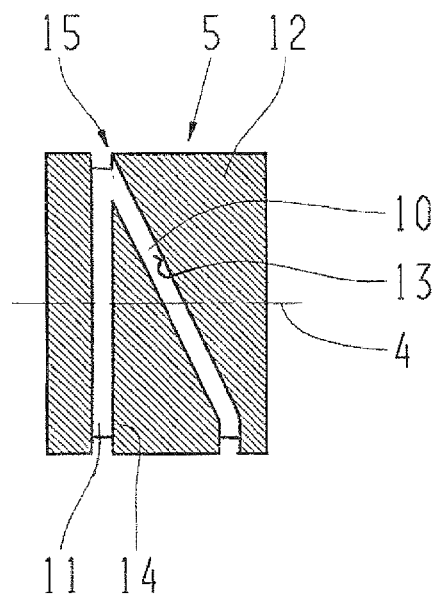
FIG. 3 depicts a top view of the outer peripheral surface of the sliding sleeve of the clutch device according to FIGS. 1 and 2 provided with two steps.

In FIG. 3, the actuation bolt 9 in its disengaging placement agent position engages in two grooves 10 and 11, provided on an outer peripheral surface 12 of the sliding sleeve 5. The outer peripheral surface 12, having the two grooves 10 and 11, is shown in FIG. 3 in a top view. In each case, one groove sidewall of the grooves 10 and 11 forms a first step having a first step flank 13, or a second step having a second step flank 14, respectively. The actuation bolt 9 rests in its disengaging placement agent position first on the first step flank 13, and then, in the completely disengaged state shown in FIG. 1, on the second step flank 14. The first step flank 13 has a step course having an axial and tangential directional component, while the second step flank 14 basically has only an axial directional component. The first step flank 13 transitions at a junction 15 into the second step flank 14.

If the clutch device 1 is in its engaged state (see FIG. 2), then the actuation bolt 9 is in its retracted disengaging placement agent position. The two clutch elements 2 and 3 are then coupled by means of the sliding sleeve 5, and rotate together about the axis of rotation 4. To bring the clutch device 1 into the disengaged state (see FIG. 1), the actuation bolt 9 is brought into its extended disengaging placement agent position, wherein it first engages in the first groove 10, and rests against the first step flank 13. Due to the rotational movement of the two clutch elements 2 and 3, as well as the sliding sleeve 5 attached thereto in a rotationally fixed manner, the actuation bolt 9 moves in the first groove 10 along the first step flank 13 towards the junction 15, whereby the sliding sleeve 5, due to the screwing effect, is displaced axially against the force of the spring 6, and is removed by the second clutch element 3. As soon as the actuation bolt 9 reaches the junction, this disengagement procedure is completed. The two clutch elements 2 and 3 are then no longer mechanically coupled to one another. The actuation bolt 9 remains in its extended disengaging placement agent position, and then rests against the second step flank 14 in the second groove 11. If the first clutch element 2 is not a driven shaft component, the rotational movement of the first clutch element 2 ceases. At this point, there is no more sliding friction between the actuation bolt 9 and the second step flank 14.

In order to return the clutch device 1 to the engaged state, preferably the first clutch element 2 is rotated by means of a drive unit not shown in FIGS. 1 and 2. When the rotation rate of the first clutch element 2 is preferably in substantially the same rotation as the second clutch element 3, the actuation bolt 9 is returned to its retracted engaging placement agent position. Then, the pre-loaded spring slides the sliding sleeve 5 axially over the second clutch element to the engaged sleeve position, as a result of which the mechanical form-locking clutch of the two clutch elements 2 and 3 is re-established.

The clutch device 1 requires very few components for the disengagement/engagement procedure. In particular, the engagement is obtained solely, substantially via the pre-loaded spring 6. As a result, the expenditure required is reduced. The weight and the space requirements of the clutch device 1 are also low, such that the clutch device 1 can be more easily incorporated in a, not shown, clutch housing. If necessary, the clutch housing can also be made smaller accordingly.

A second embodiment example of a similarly constructed clutch device 16 is shown in FIGS. 4-9. This clutch device 16 also comprises the two clutch elements 2 and 3, which are releasable by means of an, in turn, axially displaceable sliding sleeve 17, and can be coupled in a form-locking manner. The outer peripheral surface 12 of the sliding sleeve 17 is designed somewhat differently than with the sliding sleeve 5. It contains no grooves, but instead only a first step 18, having the first step flank 19 (see, in particular, FIGS. 6 and 7). The course of the first step flank 19 also has an axial and a tangential directional component. The first step flank 19 opens to the junction 20 (see FIG. 4) at an axial end surface 21 of the sliding sleeve 17.

The region of the outer peripheral surface 12 between the first step flank 19 and the edge toward the axial end surface 21 has a uniform peripheral shape. It contains, in particular, no other rises or recesses, as is the case with the groove shape according to the embodiment example of the sliding sleeve 5 shown in FIG. 3.

In the following, the functionality of the clutch unit 16 of FIG. 4 shall be explained based on a cycle having a disengagement and an engagement.

Figure 4:
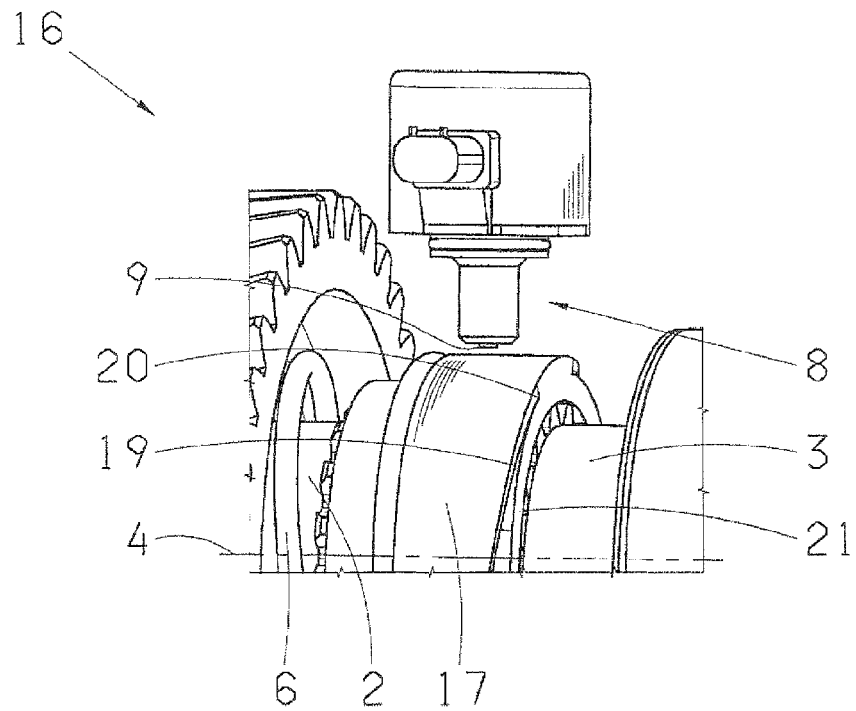
FIGS. 4-9 depict another embodiment example of a clutch device having two clutch elements, which can be coupled to one another in a rotationally fixed manner by means of an axially displaceable sliding sleeve, depicted in various clutch states.
Figure 5:
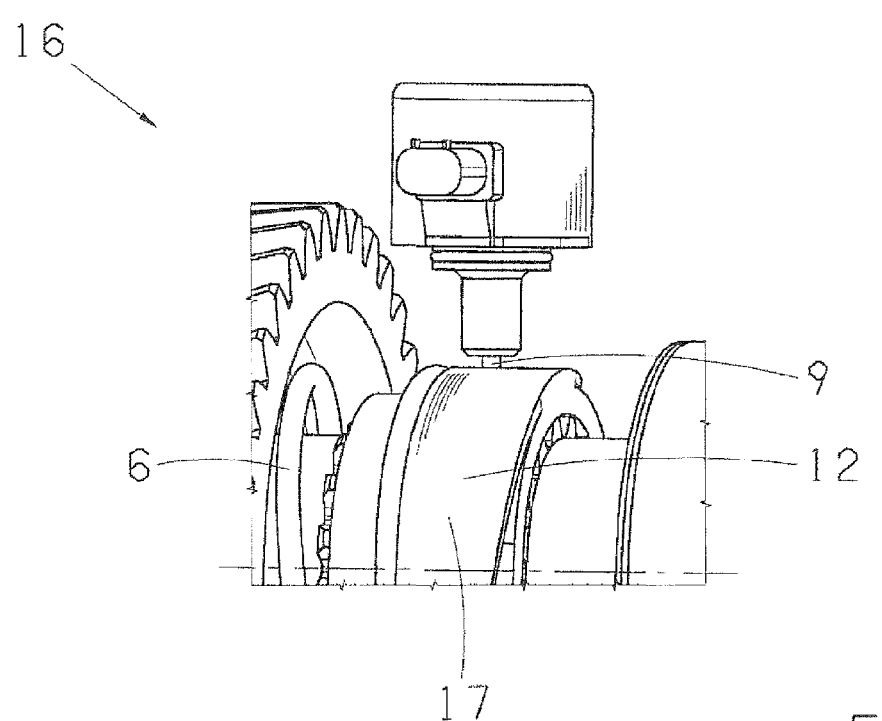
Figure 6:
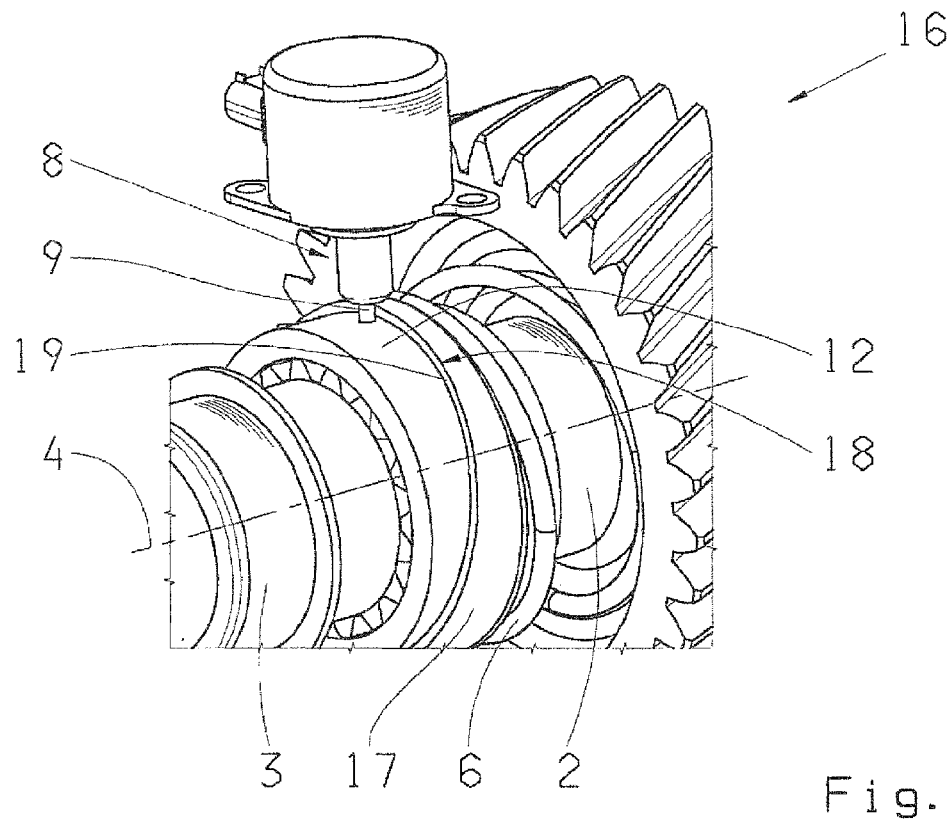

Starting from the engaged state depicted in FIG. 4, in which the actuation bolt 9 of the placement agent 8 is in its retracted engaging placement agent position, the actuation bolt 9 is first extended to a first disengaging placement agent position (see FIG. 5). It then arrives at a position resting against the first step flank 19 (see FIGS. 6 and 7). This can happen either immediately, or first over the course of the rotation of the sliding sleeve 17.

Figure 7:
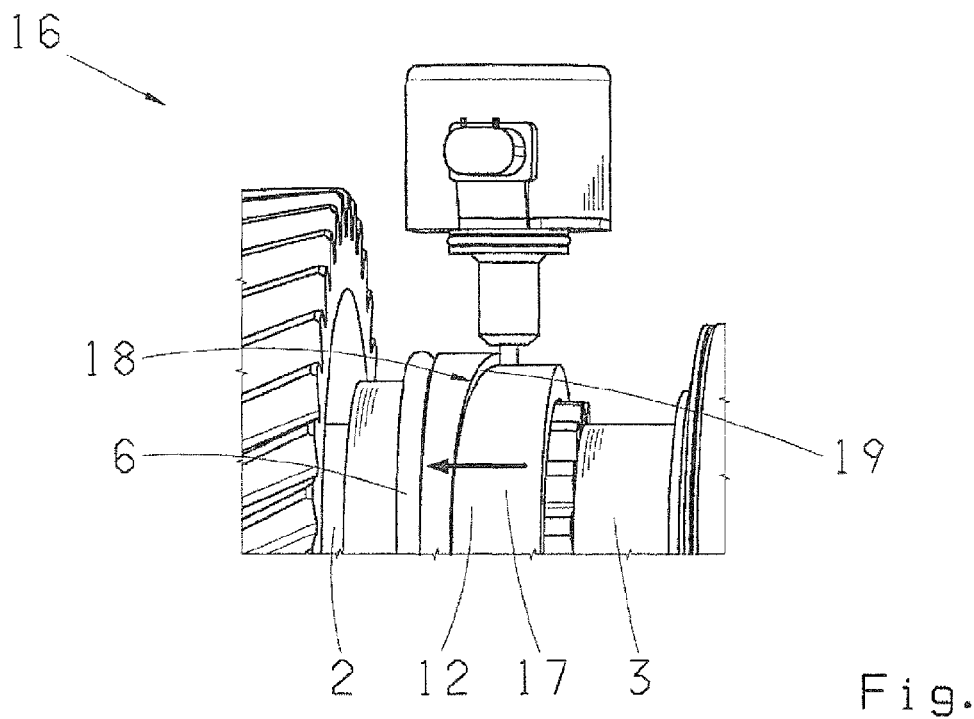
Figure 8:
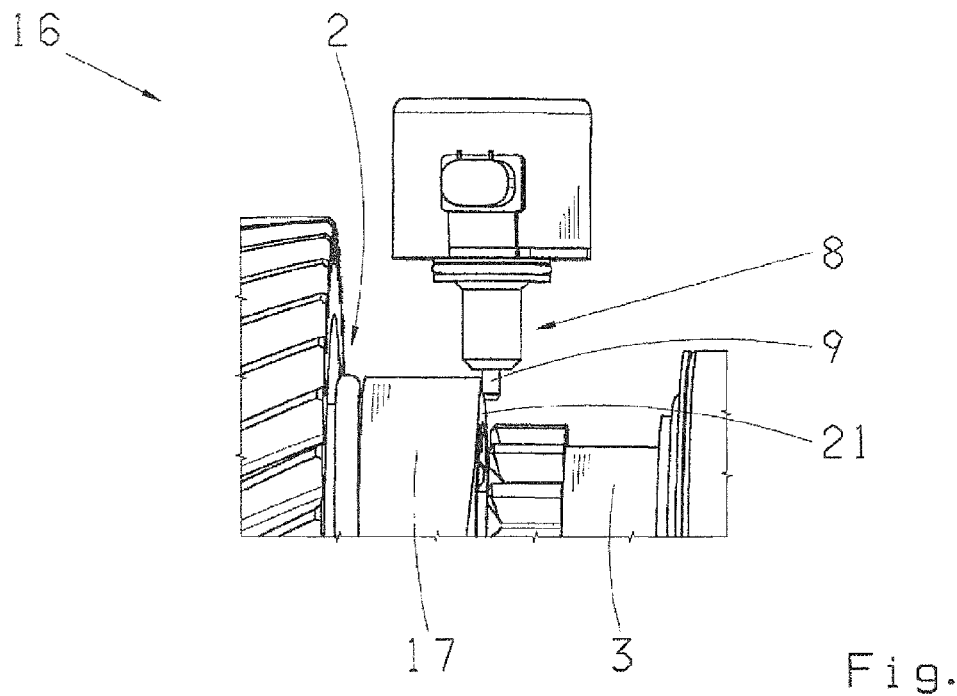

Due to the further rotation of the sliding sleeve 17, the extended actuation bolt 9 moves along the first step flank 19, wherein the sliding sleeve 17 is moved axially in the direction of the arrow inserted in FIG. 7, i.e. away from the second clutch element 3. This occurs in turn, against the force of the spring 6, and continues until the actuation bolt 9 has reached the junction 20 and therefore the axial end surface 21. The actuation bolt 9 then moves to a second disengaging placement agent position, which is slightly more extended than the first disengaging placement agent position, and is depicted in FIG. 8. In this second disengaging placement agent position the actuation bolt 9 rests against the axial end surface 21, which accordingly corresponds to the second step flank 14 of the sliding sleeve 5 shown in FIG. 3. With this embodiment example of the clutch device 16, the rotation of the first clutch element 2 to the disengaged state can also come to rest, as a result of which, there is no more sliding friction between the actuation bolt 9 and the axial end surface 21. The transition of the actuation bolt 9 from its first disengaging placement agent position to the further extended second disengaging placement agent position can occur, in particular, by means of a spring, not shown in greater detail in the figures, which is provided in the placement agent and which pushes the actuation bolt 9 out of the placement agent 8, i.e. radially toward the sliding sleeve 17. Alternatively, the actuation bolt can be extended and/or retracted electromagnetically, with an electric motor, pneumatically, or hydraulically.

To re-engage the clutch device 16, the first clutch element 2 is accelerated to the rotational rate of the second clutch element 3. The actuation bolt 9 is then brought to its retracted engaging placement agent position (see FIG. 9). Following this the sliding sleeve 17 is slid axially back onto the second clutch element 3 by means of the pre-loaded spring 6 (see arrow in FIG. 9), such that the engaged state shown in FIG. 4 is again obtained.

Figure 10:
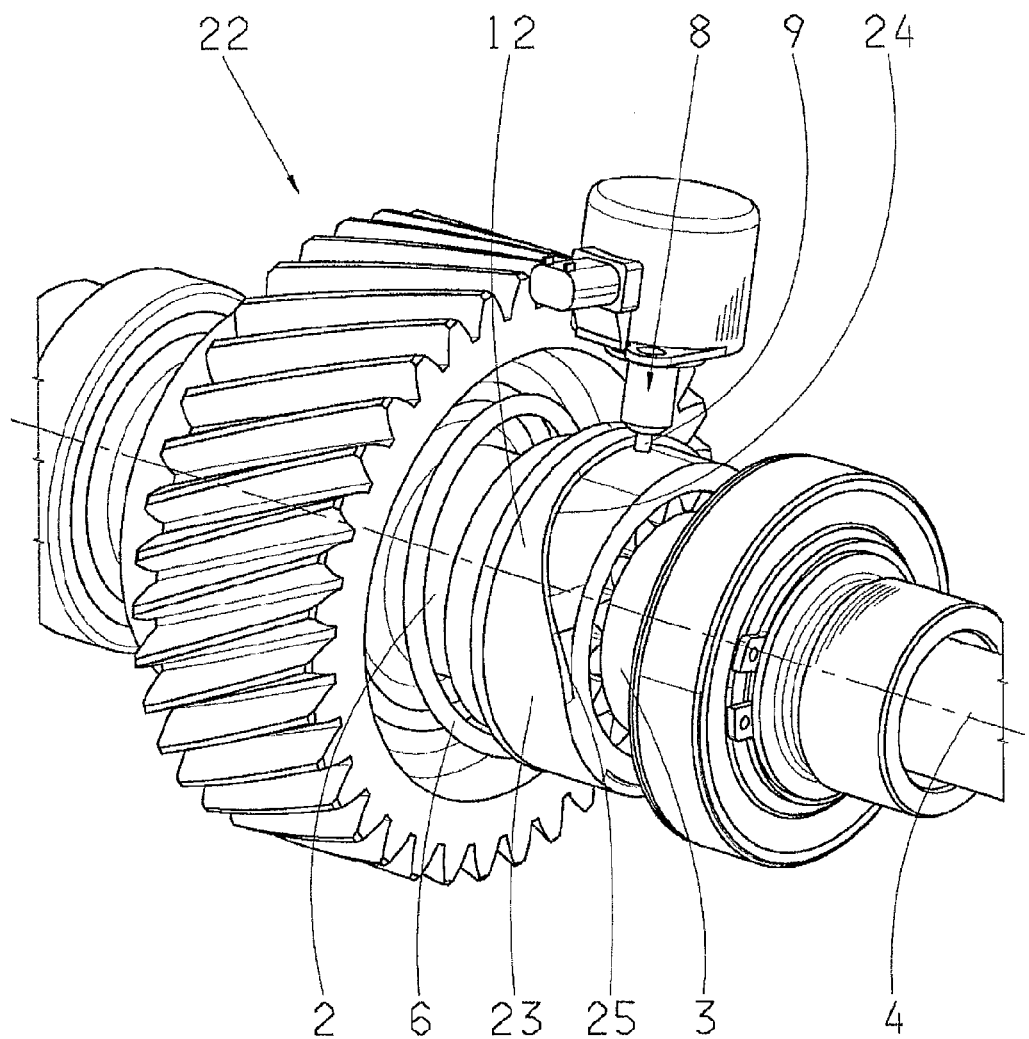
FIG. 10 depicts another embodiment example of a clutch device having two clutch elements, which can be coupled to one another in a rotationally fixed manner by means of an axially displaceable sliding sleeve, and which can be disengaged in both rotational directions.

An embodiment example of another clutch device 22 having a modified sliding sleeve 23 is shown in FIG. 10. The sliding sleeve differs from the sliding sleeve 17 in the design of the first step flank 24, which opens at both ends, in particular, in a continuous manner, i.e. without steps, onto the axial end surface 21. There is therefore, aside from the first junction 20, a second junction 25. As a result, it is possible to actuate the clutch device 22 in both rotational directions, and, particularly, to engage and disengage said clutch device. Otherwise, the functionality of the clutch device is not substantially different from that of the previously explained clutch devices 1 and 16. If necessary, other junctions may be provided, as a result of which, by means of the clutch device 22, numerous engagement and disengagement procedures within a rotation of the clutch element 2 or 3, respectively, are possible.

Embodiment examples of different sliding sleeves, in part in cross-section depictions, are shown in FIGS. 11-16, which each can be used with the clutch devices 1, 16, 22.

Figure 11:
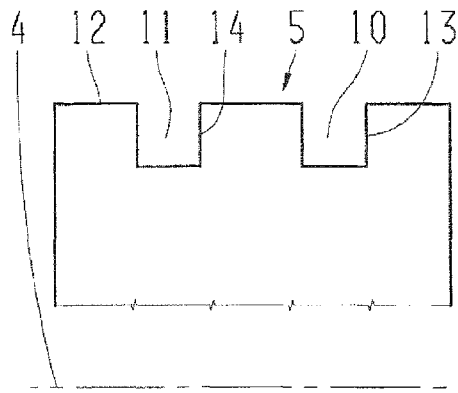
FIGS. 11-16 depict embodiment examples of different sliding sleeves for use in the clutch device according to FIGS. 1-10.

A cross-section, cut through the sliding sleeve 5 according to FIG. 3 is shown in FIG. 11. The two grooves 10 and 11 are of the same depth in this design. The actuation bolt 9 has only one disengaging placement agent position in the interaction with this sliding sleeve 5.

Figure 12:
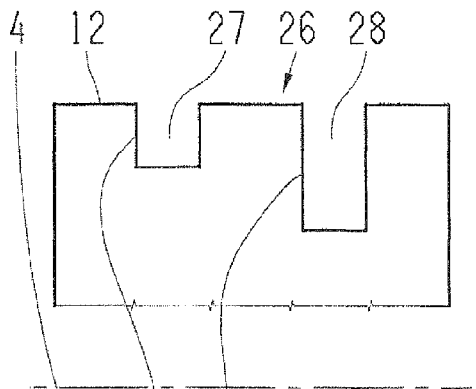

In this regard, the sliding sleeve 26 shown in FIG. 12, the grooves 27 and 28 of which have different depths, is different. The actuation bolt 9 rests in the groove 27 on the first step flank 29, and in the deeper groove 28, on the second step flank 30. With this design, the placement agent 8 has two disengaging placement agent positions, in order to ensure a "clicking in place" of the actuation bolt 9 in the deeper second groove 28. The sliding sleeve 26 is then securely retained in the disengaged sleeve position.

Figure 13:
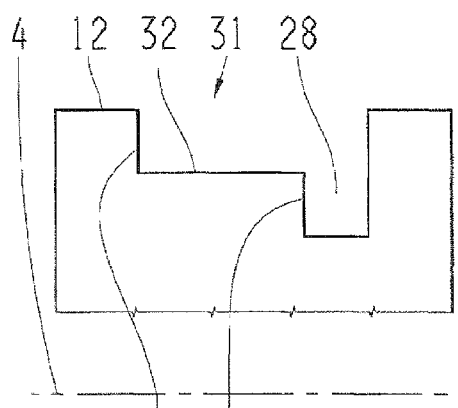

As a variation on the sliding sleeve 26, the sliding sleeve 31 is depicted in FIG. 13. The sliding sleeve 31 has only the second groove 28. On the other hand, the region between the first step flank 29 and the second step flank 30 is designed as a uniform peripheral surface 32, which, in differing from the step geometry according to FIG. 12, has no further rises, e.g. in the form of the second groove sidewall of the first groove 27. The surface material, in contrast to the design according to FIG. 12, is fully removed in the region of the uniform peripheral surface 32 between the two step flanks 29 and 30.

Figure 14:
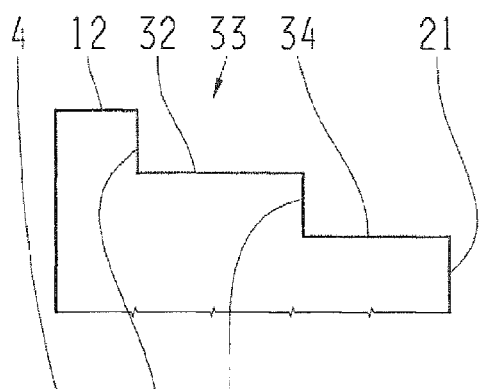

According to another variation of a sliding sleeve 33, shown in FIG. 14, the region between the second step flank 30 and the axial end surface 21 is also designed as a uniform peripheral contour 34, with fully removed surface material.

Figure 9:
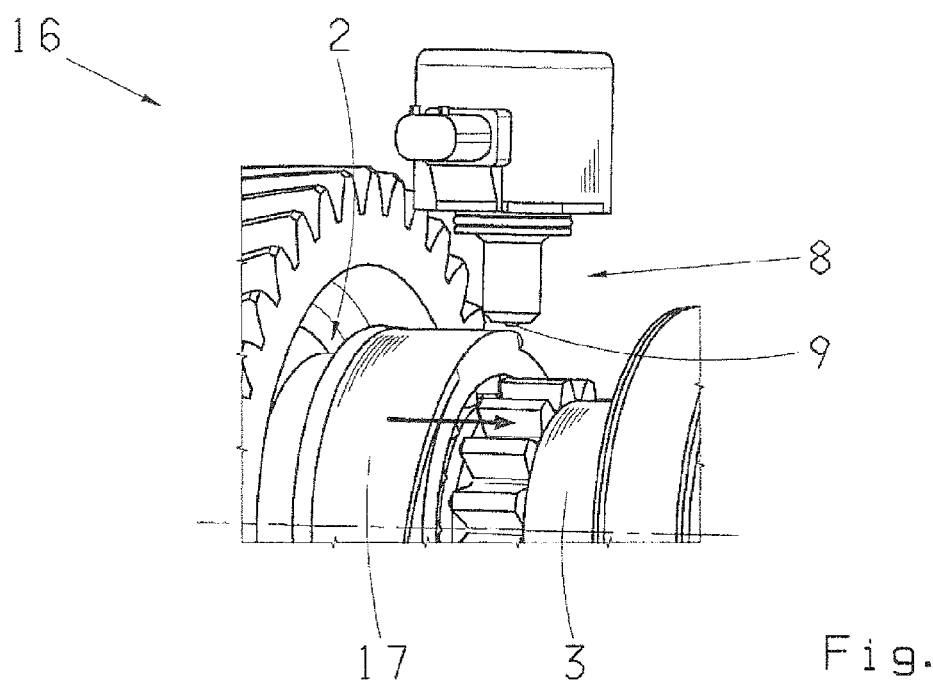
Figure 15:
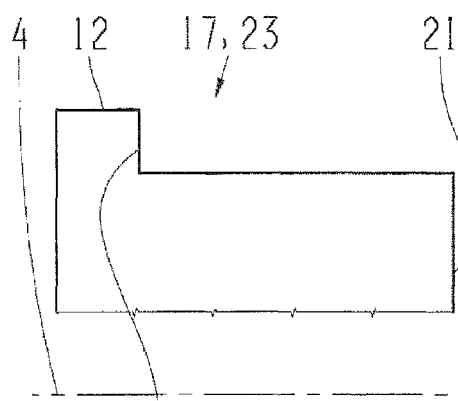

A cross-section, cut through the sliding sleeves 17 and 23 according to FIGS. 4 and 9, respectively, is shown in FIG. 15.

Figure 16:
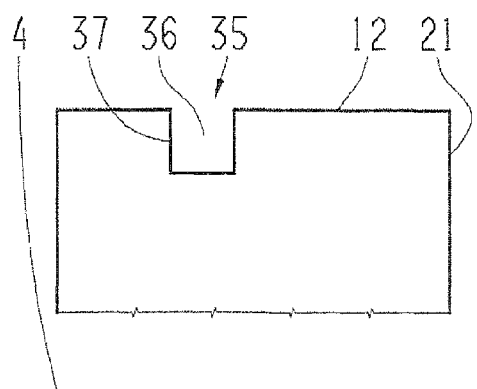

A variation on this is shown in FIG. 16 in the form of the sliding sleeve 35. It contains a groove 36, having a first step flank 37, which opens into the axial end surface 21. The axial end surface 21 therefore forms, respectively, the second step flank in the sliding sleeves 17, 23 and 35 shown in cross-section in FIGS. 15 and 16, against which the actuation bolt 9 rests when in the fully disengaged state of the associated clutch device.

With the sliding sleeves 5, 26, 31 and 33 shown in the four preceding FIGS. 11-14, a second step flank, 14 or 30, respectively, is provided in each case instead, against which the actuation bolt 9 rests when the respective clutch device is in the disengaged state.

Fundamentally, the step flanks may be designed to have one gear, or numerous gears on the periphery of the sliding sleeve.

All of the clutch devices 1, 16, and 22, as well as the sliding sleeves 5, 17, 23, 26, 31, 33, and 35 described above may be used in connection with the advantageous spring force-supported return to the engaged state, such that in each case an extremely favorable result is obtained with respect to weight, space requirements, and cost-effectiveness.

REFERENCE SYMBOLS 1 clutch device
2 first clutch element
3 second clutch element
4 axis of rotation
5 sliding sleeve
6 spring
7 projection
8 placement agent
9 actuation bolt
10 groove
11 groove
12 outer peripheral surface
13 first step flank
14 second step flank
15 junction
16 clutch device
17 sliding sleeve
18 first step
19 first step flank
20 junction
21 axial end surface
22 clutch device
23 sliding sleeve
24 first step flank
25 junction
26 sliding sleeve
27 first groove
28 second groove
29 first step flank
30 second step flank
31 sliding sleeve
32 uniform periphery contour
33 sliding sleeve
34 uniform periphery contour
35 sliding sleeve
36 groove
37 first step flank

We claim:
1. A clutch device of a motor vehicle drive train transmission, comprising:
a first clutch element;
a second clutch element;
wherein the first clutch element and the second clutch element are supported to rotate about a common rotational axis, and
wherein the first clutch element and the second clutch element are coupled to one another in an engaged state in a form-locking manner by a sliding sleeve,
wherein the sliding sleeve is attached in a rotationally-fixed, and axially-displaceable manner to the first clutch element;
wherein the sliding sleeve comprises a peripheral surface having a first step, the first step having a first step flank extending with a first step course on the peripheral surface of the sliding sleeve,
wherein the first step course exhibits at least one axial directional component in the direction of the axis of rotation; and
a placement agent capable of sliding radially back and forth between a first engaging placement agent position and a first disengaging placement agent position, and is otherwise stationary,
wherein the placement agent rests against the first step flank during a procedure for disengaging the first and second clutch elements in the first disengaging placement agent position such that the sliding sleeve moves axially away from the second clutch element to a disengaged sleeve position with a rotation of the first clutch element until the first and second clutch elements are mechanically disengaged from one another in a disengaged state, wherein the sliding sleeve is supported by an axially-acting spring such that a spring force of the spring retains the sliding sleeve in an engaged sleeve position or acts to slide the sleeve into the engaged sleeve position, and when the sliding sleeve is in the engaged sleeve position, the first clutch element is mechanically coupled to the second clutch element.

2. The clutch device of claim 1 wherein the first step is a part of a first groove and the first step flank is a first groove sidewall of the first groove.

3. The clutch device of claim 2 wherein the second groove has a greater groove depth than the first groove, and the placement agent has a second disengaging placement agent position, wherein, in the disengaged state, the placement agent rests in the second disengaging placement agent position on the second groove sidewall forming the second step flank in the second groove.

4. The clutch device of claim 1, wherein the peripheral surface of the sliding sleeve has a second step, the second step having a second step flank and a second step course, wherein the second step course substantially contains only a tangential directional component that is tangential to the axis of rotation, wherein the first step opens into the second step, and the placement agent rests against the second step flank when the first clutch element and the second clutch element are in the disengaged state.

5. The clutch device of claim 4 wherein the first step opens into the second step at both ends of the first step.

6. The clutch device of claim 4 wherein the second step is part of a second groove and the second step flank is a second groove sidewall of the second groove.

7. The clutch device of claim 4 wherein the second step extends from the peripheral surface to an axial end surface of the sliding sleeve, and wherein the second step flank is the axial end surface.

8. The clutch device of claim 1 wherein the peripheral surface of the sliding sleeve has a uniform peripheral contour between the first step flank and the second step flank.

9. The clutch device of claim 8 wherein the placement agent has a second disengaging placement agent position and when the placement agent is in the second disengaging placement agent position, the placement agent rests against an axial end surface of the sliding sleeve.

10. The clutch device of claim 1 wherein the spring is supported on the first clutch element.

* * * * *

UNITED STATES PATENT AND TRADEMARK OFFICE
CERTIFICATE OF CORRECTION

Page 1 of 1

PATENT NO. : 8,919,515 B2
APPLICATION NO. : 13/669823
DATED : November 6, 2012
INVENTOR(S) : Claus Granzow et al.

It is certified that error appears in the above-identified patent and that said Letters Patent is hereby corrected as shown below:

On the Title Page

Left column, item (30) Foreign Application Priority Data,

"10 2011 085 839" should be --10 2011 085 839.3--.

Signed and Sealed this
Twenty-third Day of June, 2015

Michelle K. Lee
*Director of the United States Patent and Trademark Office*